United States Patent
Lodeiro et al.

(10) Patent No.: US 10,749,760 B2
(45) Date of Patent: Aug. 18, 2020

(54) METHOD AND SYSTEM FOR MANAGING A SERVICE PROVIDER INFRASTRUCTURE

(71) Applicant: Intraway R&D S.A., Montevideo (UY)

(72) Inventors: Lucas Lodeiro, Buenos Aires (AR); Ezequiel Lopez Pareja, Buenos Aires (AR); Gaston Scapusio, Buenos Aires (AR)

(73) Assignee: Intraway R&D S.A., Montevideo (UY)

(*) Notice: Subject to any disclaimer, the term of this patent is extended or adjusted under 35 U.S.C. 154(b) by 139 days.

(21) Appl. No.: 15/938,254

(22) Filed: Mar. 28, 2018

(65) Prior Publication Data

US 2018/0287895 A1    Oct. 4, 2018

Related U.S. Application Data

(60) Provisional application No. 62/478,016, filed on Mar. 28, 2017.

(51) Int. Cl.
| | |
|---|---|
| G06F 15/173 | (2006.01) |
| H04L 12/24 | (2006.01) |
| H04L 29/08 | (2006.01) |
| H04L 29/06 | (2006.01) |

(52) U.S. Cl.
CPC ...... *H04L 41/5054* (2013.01); *H04L 41/0806* (2013.01); *H04L 41/5009* (2013.01); *H04L 41/5041* (2013.01); *H04L 41/5064* (2013.01); *H04L 67/16* (2013.01); *H04L 63/08* (2013.01)

(58) Field of Classification Search
CPC ............ H04L 41/5054; H04L 41/0806; H04L 41/5009; H04L 41/5041; H04L 41/5064; H04L 67/16; H04L 63/08

USPC ........................................................ 709/223
See application file for complete search history.

(56) References Cited

U.S. PATENT DOCUMENTS

| | | | | |
|---|---|---|---|---|
| 2002/0178252 | A1* | 11/2002 | Balabhadrapatruni | H04L 41/5054 709/223 |
| 2005/0027851 | A1* | 2/2005 | McKeown | H04L 12/2874 709/224 |
| 2007/0255656 | A1* | 11/2007 | Olson | G06Q 10/06 705/40 |
| 2009/0157457 | A1 | 6/2009 | Huuhtanen et al. | |
| 2010/0293269 | A1* | 11/2010 | Wilson | G06F 9/5061 709/224 |
| 2011/0103566 | A1* | 5/2011 | Sarkar | H04L 41/32 379/201.12 |

(Continued)

OTHER PUBLICATIONS

European Search Report for EP18164788 dated Aug. 15, 2018.

(Continued)

*Primary Examiner* — Alan S Chou
(74) *Attorney, Agent, or Firm* — Peter A. Nieves; Sheehan Phinney Bass & Green PA

(57) ABSTRACT

A computer-based method (and associated system) for managing services provided by a service provider includes receiving a service order at a computer-based workflow engine, sending a generic ready-to-activate service order to a provisioning engine if network element involvement is needed to perform a step involved in satisfying the service order, assembling a command at the provisioning engine, in a format that is specific to the network element, to perform the step, and sending the network element-specific command from the provisioning engine to the network element.

18 Claims, 6 Drawing Sheets

(56) References Cited

U.S. PATENT DOCUMENTS

| | | |
|---|---|---|
| 2011/0252457 A1 | 10/2011 | Srivastava et al. |
| 2013/0055258 A1* | 2/2013 | De .............................. G06F 8/63 |
| | | 718/1 |
| 2013/0236774 A1 | 9/2013 | Davison |
| 2016/0337193 A1* | 11/2016 | Rao ..................... H04L 12/4641 |
| 2017/0078162 A1* | 3/2017 | Cimprich ............ H04L 41/0806 |
| 2019/0026201 A1* | 1/2019 | Witt ........................ H04L 67/00 |

OTHER PUBLICATIONS

Puksec Dunja Grcic, "Transforming telco service and resource provisioning", 2016 24th Telecommunications Forum (TELFOR), IEEE, Nov. 22, 2016, pp. 1-4.
Jarraya Yosr, et al; "A Survey and a Layered Taxonomy of Software-Defined Networking", IEEE Communications Surveys & Tutorials, vol. 16, No. 4, Apr. 3, 2014.
Partial Search Report for EP18164788 dated Jun. 8, 2018.
Provisioning, Ericsson Multi Activation; Multi Activation 6.1 Commercial presentation | Ericsson Confidential | 1/221 09-FGC 101 0747 Uen, Rev B | Oct. 4, 2010 | p. 1.

\* cited by examiner

METHOD AND SYSTEM FOR MANAGING A SERVICE PROVIDER INFRASTRUCTURE

CROSS-REFERENCE TO RELATED APPLICATION(S)

This application claims the benefit of priority to U.S. Provisional Patent Application No. 62/478,016, entitled Real-time Universal Service Activator, which was filed on Mar. 28, 2017, the disclosure of which incorporated by reference herein in its entirety.

FIELD OF THE INVENTION

This disclosure relates to a method and system for managing a service provider's infrastructure, regardless of whether that infrastructure includes services and/or equipment of multiple different vendors.

BACKGROUND

A service provider is a company that makes one or more services (e.g., telecom, internet, cable TV, satellite TV, etc.) available to its customers or subscribers.

One example of a telecommunication service is a telephone subscription, which may include, for example, access to telephone services on a prepaid, fixed or unlimited subscription plan. The telephone service may use any one of a variety of different networks (e.g., 3g, 4g, LTE), have different caps or limits, include voicemail service (or not), include multimedia service (or not), include short message service (SMS) (or not), etc. Some subscription plans may include telephone services as well as other services, such as television over cable, fiber or satellite, etc.

Service providers typically own or rent infrastructure that supports providing the services. The infrastructure may include, for example, one or more network elements that facilitate rendering the services. Network elements are devices (e.g., Remote Authentication Dial-In User Services (RADIUS) routers, Home Location Registers (HLR), Digital Subscriber Line Access Multiplexer (DSLAM), soft switches, web servers, (DOCSIS) cable modems, embedded multimedia terminal adapters (E-MTA), set-top boxes, optical network terminals (ONT), modems xDSL, FTP/TFTP servers, cable modem termination systems (CMTS), etc.) that provide or facilitate providing one or more services on a service provider's infrastructure.

The network elements may communicate through different communication channels such as, for example, SNMP, TL1, Telnet, SSH, FTP, HTTP, LDAP, CORBA, SQL, Netconf, DOCSIS, etc. They may follow different protocols and may be implemented using different programming languages. Moreover, the protocols and programming languages may differ depending on the vendor (e.g., who manufactures the device), model and version.

Typically, the service provider provides any services needed to satisfy the requirements of the subscription plans he or she sells. For example, a "GSM free" subscription plan offered by a telecommunications service provider may include services such as voicemail, SMS and a phone line. As another example, a satellite TV subscription may include, for example, the availability of some TV channels and some occasional promotions. Once a service provider sells a new subscription plan, he or she typically needs to activate the underlying services within his or her infrastructure in order for the subscriber to receive the service(s) he or she is paying for. Typically, the service provider can start charging for the subscription only once the service is enabled or activated, hence there is a need to make this happen, and it is desirable to do this quickly, and with an efficient use of resources. Analogously, the service provider may need to interact with his or her infrastructure for subscription deactivations or modifications, or when one or more of the network elements in the infrastructure is to be modified, replaced or removed.

The process of managing a service provider's infrastructure (e.g., to activate, deactivate, or modify) services, etc. can be complex, difficult, time consuming, and expensive.

SUMMARY OF THE INVENTION

In one aspect, a computer-based method is disclosed for managing services provided by a service provider. The computer-based method includes: receiving a service order at a computer-based workflow engine, sending a generic ready-to-activate service order to a provisioning engine if network element involvement is needed to perform a step involved in satisfying the service order, assembling a command at the provisioning engine, in a format that is specific to the network element, to perform the step, and sending the network element-specific command from the provisioning engine to the network element.

In another aspect, a method for managing client services and infrastructure of a service provider is disclosed, where the infrastructure includes a northbound interface (NBI), a workflow engine, a provisioning engine and network connectors. The method includes retrieving, at the NBI, a service order from a queue, validating that the NBI can fulfill the service order and retrieving information from a database, sending the service order from the NBI to the workflow engine queue, retrieving, at the workflow engine, a workflow associated with the service order from the database, and executing the workflow with the workflow engine.

In yet another aspect, a computer-based system for managing client services and infrastructure of a service provider is disclosed. The system includes: a northbound interface, a service orders queue, a workflow engine, a ready-to-activate service orders queue, a provisioning engine, and a plurality of network connectors (connected to network elements). During operation, the northbound interface can receive a service order, validate the service order, and place the service order in the service orders queue for the workflow engine to process, The workflow engine retrieves the service orders from the service orders queue, identifies a workflow that corresponds to the service order, and executes according to steps in the workflow.

In an exemplary implementation, executing according to the steps in the workflow includes: for any steps that do not require action from a network element that is coupled to one of the network connectors, performing the step at the workflow engine, but 0 for any steps that do require action from a network element that is coupled to one of the network connectors: placing a ready-to-activate service order in the ready-to-activate service orders queue.

In an exemplary implementation, the provisioning engine reads the ready-to-activate service order from the ready-to-activate service orders queue, assembles a command for the network element, from which action is required, in a format that is specific to that network element, and sends the command to that network element.

Moreover, in an exemplary implementation, the provisioning engine receives a response to the command from the network element, and parses the response to identify one or more parameters associated with the response.

In some implementations, one or more of the following advantages are present.

For example, in a typical implementation, the systems and techniques disclosed herein provide a technical solution to the technical problem of managing a service provider's infrastructure in an efficient, reliable manner. The management processes in this regard may include, for example, activating, deactivating, or modifying one or more services available to service users from the service infrastructure.

Additionally, in some implementations, the systems and techniques disclosed herein may ease the burden on the service provider's information technology staff in tracking and managing the infrastructure's network topology (including, e.g., what network elements are active, their security credentials, network interfaces, versions, models and vendors, etc.).

In some implementations, the systems and techniques disclosed herein simplify the activation, deactivation, modification, etc. of various network elements across the infrastructure, even though each of those network elements may have its own complexities when it comes to starting connections, logging in, executing commands, closing connections, etc.

Moreover, in some implementations, the systems and techniques disclosed herein provide a technical solution for the technical problems that can arise when a workflow needs to be put on hold because a busy network element may not be able to respond to a workflow communication immediately.

Additionally, in some implementations, the systems and techniques disclosed herein provide a technical solution to the technical problem of the infrastructure dealing with network element errors or exceptions.

In some implementations, the systems and techniques disclosed herein provide a technical solution to the technical problem that portions of scripts that get sent to the various network elements may need to be implemented in accordance with different protocols and use different programming languages, because of the different vendors, models, and versions of network elements that may be present in the infrastructure.

In some implementations, the systems and techniques disclosed herein, simplify certain processes, such as the activation of a "GSM fixed" service, thereby, increasing reliability of those processes. When there is a failure in performing a particular process, implementations of the system and techniques disclosed herein provide for undoing some (or all) actions in the process, and logging the failure so that it can be fixed at a later time and the activation, for example, can be continued.

Additionally, in some implementations, the systems and techniques disclosed herein may provide for load-balancing and/or priority-based queuing for communications with network elements and/or internal system components.

Other features and advantages will be apparent from the description and drawings, and from the claims.

BRIEF DESCRIPTION OF THE DRAWINGS

Like reference characters refer to like elements.

DETAILED DESCRIPTION

Figure 1:
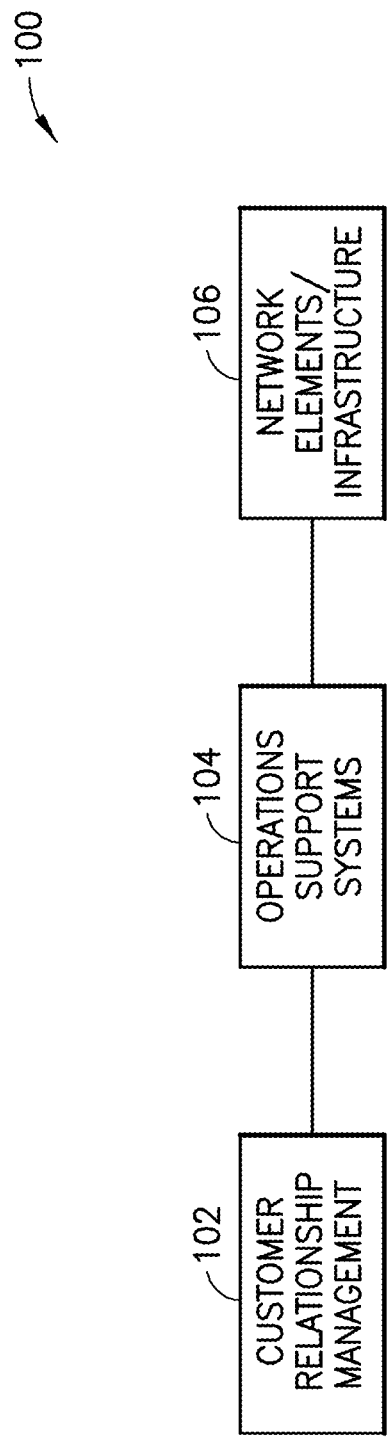
FIG. 1 is a schematic representation of an exemplary service provider's infrastructure configured to facilitate service activation and management.

FIG. 1 is a schematic representation of an exemplary service provider's infrastructure 100 that is configured to facilitate the activation and management of various services that are, or may be made, available to the service provider's customers. The services may include, for example, any one or more of telecom, internet, cable TV, satellite TV, etc.

The infrastructure 100 may have a customer relationship management system 102 and an operations support system 104, and must have network elements/associated infrastructure 106. In a typical implementation, and as described herein in further detail, service orders (e.g., requests for service activation, deactivation or modification) may originate at the customer relationship management system 102, which may be physically located in a brick and mortar store of the service provider. Service orders could be originated by other means. The service orders can be transmitted to the operations support system 104, which executes processes and/or causes processes to be executed to satisfy each service order it receives. The network elements 106 provide functionalities to support or provide the associated services, and interact with the operations support system 104, for example, and/or other system components to help satisfy the service orders.

In a typical implementation, the operations support system 104 is preconfigured (e.g., during set-up, or reconfiguration, or updating of the infrastructure 102) with preconfigured workflows and network connectors to facilitate and/or perform the various functionalities disclosed herein. Once configured, the illustrated infrastructure 100 may be able to provide a comprehensive suite of functionalities that help the service provider quickly add users to any of its services, modify parameters underlying these services for one or more users, remove users from a service, or otherwise manage its infrastructure. In various implementations, the quick-launch activation packages may include one or more of the following: fiber access (EPON, GPON, DPoE), Metro-Ethernet & Ip-VPN, Multiscreen TV, SDN-NFV Orchestration, IoT Self-Management, VoLTE, etc. Moreover, in a typical implementation, once configured, the infrastructure 100 enables the service provider to activate, deactivate, or modify any service, from any technology, across any network, from a single point (e.g., a single user interface terminal).

Figure 2:
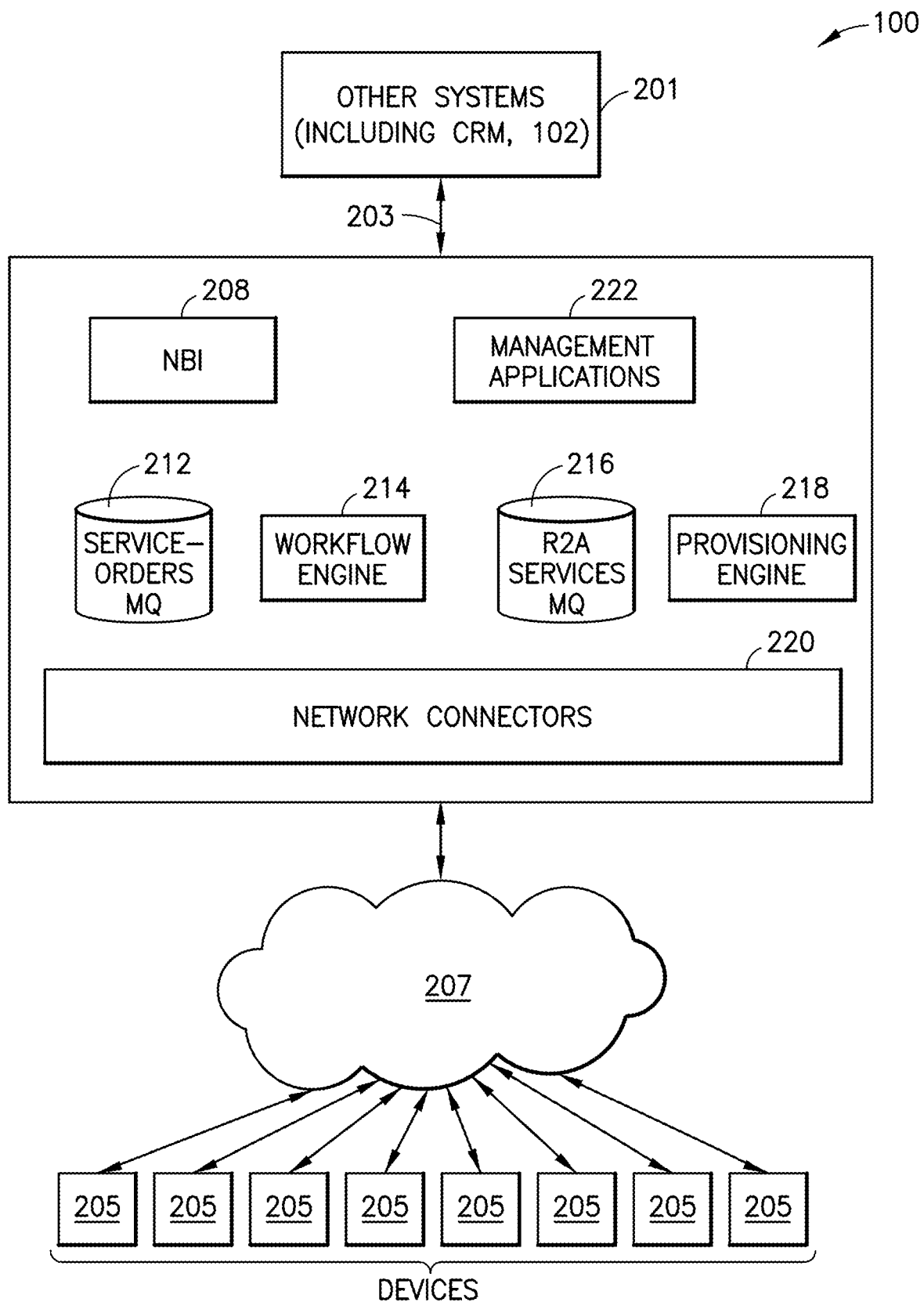
FIG. 2 is a more detailed schematic representation of the service provider's infrastructure of FIG. 1.

FIG. 2 is a more detailed schematic representation of the service provider's infrastructure 100 of FIG. 1.

Most notably, the schematic in FIG. 2 shows a detailed view of the operations support system 104, which is coupled between the network elements and associated infrastructure 106 and other computer-based systems 201 including, for example, the customer relation management (CRM) system 102, of the service provider's infrastructure 100. The CRM 102 in the illustrated implementation is able to communicate with the operations support system 104 via one or more communication channels 203. The operations support system 104 in the illustrated implementation is able to communicate with the network elements 205 via a communications network 207.

As mentioned previously, in a typical implementation, the customer relationship management system (CRM) 102 functionality may be physically located at, or accessible from, any computer in a brick and mortar store of the service provider. In a typical implementation, the CRM provides a service and many clients can use the service concurrently. Typically, sales associates for the service provider might interact with the CRM system 102 to create service orders (e.g., for service activations, deactivations, and/or modifications) in response to requests from customers who have either visited or called into the store. The service orders from the CRM system 102 make their way to the operations support system 104, which typically is at a remote location relative to the CRM system 102. In an exemplary implementation, the operations support system 104 may be located at the service provider's headquarters or at a satellite facility of the service provider. The operations support system 104 executes the service orders, involving the network elements 205, as needed. The network elements 205 may be located in any one or more of a variety of different locations (e.g., the service provider's headquarters, a satellite facility, or some other physical location). In some implementations, all of the network elements 205 are located at the same physical location (e.g., in the same building or physical structure), but in some implementations, the network elements 205 can be located in two or more different physical locations (buildings or physical structures) near or far from one another. To be clear, as an example, an antenna in a street can be a network element, the CMTS that are spread in each big city or state are also network elements. They only need to be connected to the network.

The illustrated operating support system 104 has an interface (e.g., northbound interface, NBI 208) with an application programming interface 210, a service orders queue (service orders MQ) 212, a workflow engine 214, a ready-to-activate service orders queue (R2A services MQ) 216, a provisioning engine 218, network connectors 220, as well as one or more management applications 222.

In an exemplary implementation, the northbound interface (NBI) 208 is a computer software application that may be executed, for example, by one or more computer processors of the infrastructure 100. In some implementations, the NBI 208 may be implemented as a web application or web service. In a typical implementation, an NBI 208 enables a network component to communicate with a higher-level component. In the illustrated implementation, the NBI 208 receives service orders (from the CRM 102) through its API 210, validates the service orders it receives, and places the service orders in a queue (i.e., the service orders queue 212) for the workflow engine 214 to process.

In an exemplary implementation, the service orders queue 212 may include computer-based memory, and is able to temporarily store validated service orders before they are retrieved from, and acted upon by the workflow engine 214.

In an exemplary implementation, the workflow engine (WFE) 214 is a computer software application that may be executed, for example, by one or more computer processors of the infrastructure 100. Moreover, one or more instances of the workflow engine (computer software) may run concurrently. Hereafter we shall refer to any of these instances as the workflow engine. In a typical implementation, the WFE 214 retrieves service orders from the service orders queue 212, validates those service orders, and, for the service orders that are deemed valid, the WFE 214 executes steps in accordance with a workflow for that service order. In a typical implementation, if the WFE 214 is suitable to execute particular steps in a workflow being executed (e.g., if there is no need for any of the network elements to be involved), it does so. Otherwise, if network element involvement is required to execute one (or more) of the steps in a particular workflow, the WFE 214 enlists the assistance of the provisioning engine 218 by placing a request (in generic form) for the step to be performed in the ready-to-activate services queue 218, which the provisioning engine (PE) 218 will retrieve and take action on. A workflow explicitly includes information as to which steps are executed by a network element of a given type, and which steps do not require any network element.

In an exemplary implementation, the ready-to-activate orders queue 212 may include computer-based memory, and is able to temporarily the generic-form requests from the WFE 214 before they are retrieved from, and acted upon by the provisioning engine (PE) 214.

In an exemplary implementation, the provisioning engine (PE) 214 is a computer software application that may be executed, for example, by one or more computer processors of the infrastructure 100. One or more instances of the provisioning engine may run concurrently, however we simply refer to any of these as provisioning engine. In a typical implementation, the PE 214 receives generic (e.g., lower-level) requests to perform steps from workflows, and executes them with the network elements 205 through the underlying instantiated network connectors 220.

In an exemplary configuration, an (instantiated) network connector, or connector for short, encodes configuration and specifications allowing the provisioning engine 214 to communicate with the network elements 205. In particular, a connector 214 can be queried with one or more generic commands for its network type and answer with the specific command that needs to be issued, and it can be queried with the output of a network element to which it responds with the list of output parameters in a generic specification.

In an exemplary implementation, the management applications 222 include one or more computer software applications that typically provide different services to the other components of the operations support system 104. These services can include, for example, a log and fallout system service and a connector design framework service.

In certain implementations, functionality of various components disclosed herein can be implemented as one or more programs that may be run from different components interacting with a protocol, as described herein. The system implementing that includes these components, or upon which the components operate, may include one or more computers, servers, or other devices having computer-based memory and computer-based processor(s). More than one instance of each application can be deployed and any desired balancing procedures can be applied in order to improve throughput.

Figure 3A:
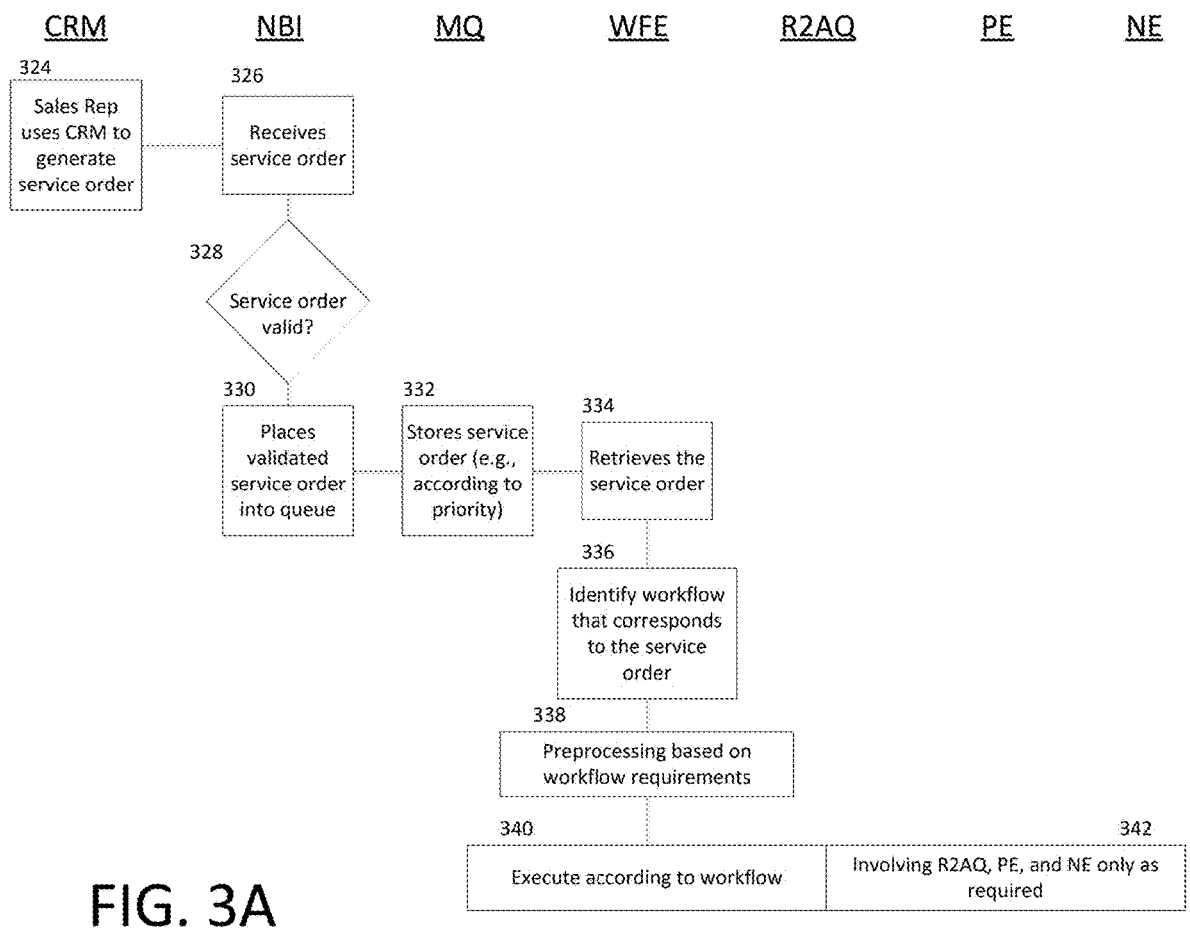
FIGS. 3A and 3B are flowcharts of exemplary processes that may be performed by the infrastructure components in the service provider's infrastructure of FIGS. 1 and 2.
Figure 3B:
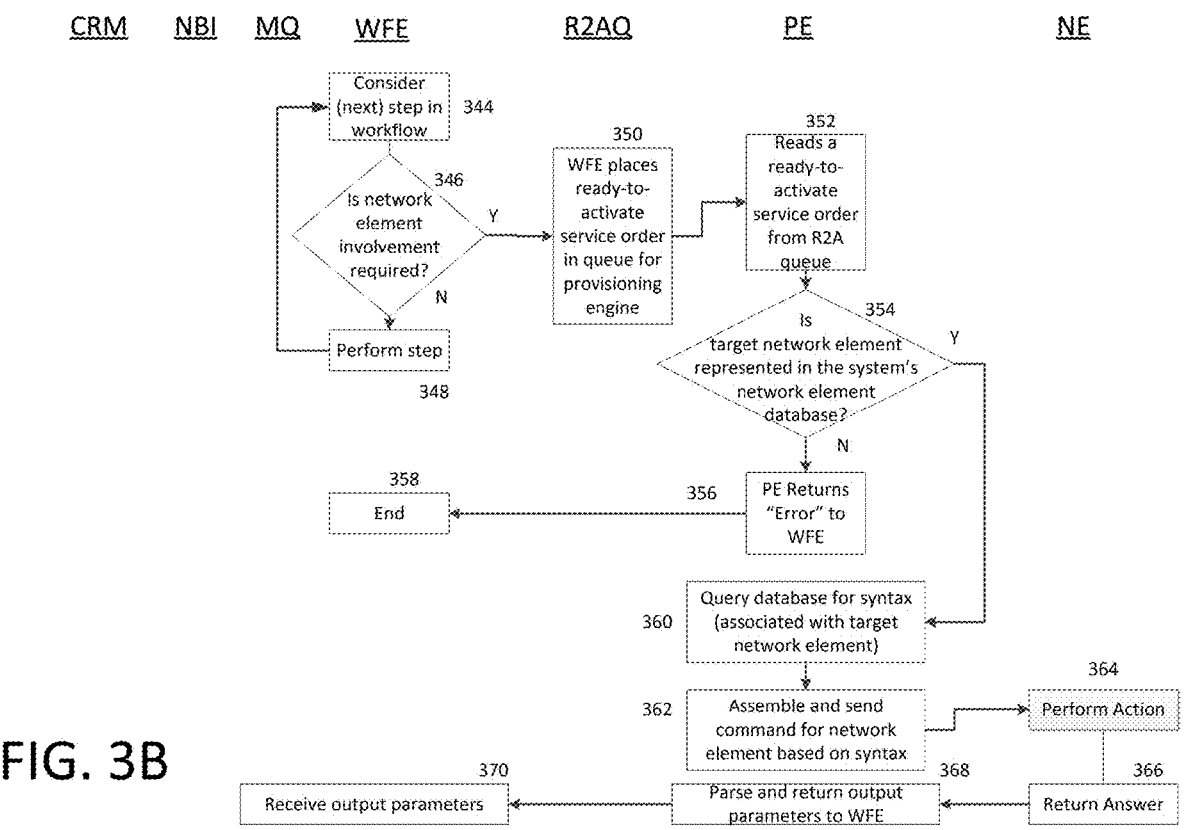

FIG. 3 is a flowchart of exemplary processes that may be performed by the infrastructure components in the service provider's infrastructure of FIGS. 1 and 2.

The flowchart is organized into columns, with each column representing a particular one of the indicated components from the service provider's infrastructure 100 including, the customer relationship management (CRM) system 102, northbound interface (NBI) 208, the service orders queue (MQ) 212, the workflow engine (WFE) 214, the ready-to-activate service orders queue (R2AQ) 216, the provisioning engine (PE) 218, a network element (NE) 205, and the management application(s) (MA) 222. The action blocks that appear within each column represent actions performed by the system component that corresponds to that column.

According to the illustrated flowchart, a person (e.g., one of the service provider's sales representatives) (at 324) interacts with the CRM to generate a service order. The service order may include, for example, a request to have a subscription plan activated, modified, or deactivated, or some other business-related request. An exemplary service order includes: 1) an identification of a particular product/service available from the service provider (e.g., GSM, broadband 10 MB, HBO channel, etc.), 2) an order relating to that particular product/service (e.g., to activate, modify, or deactivate that particular produce/service), and 3) (optionally) some (or all) of the data required to execute the service order (e.g., client name, SIM card information, set-top box ID, etc.).

In some implementations, the service order 208 is transmitted (e.g., across communication channel 203) in the form of an HTTP/HTTPS request.

The NBI 208 (at 326) receives the service order. There are a variety of ways that the NBI 208 might receive a particular service order. In some implementations, the service order may be received through an API (e.g., 210) of the NBI 208. In some implementations, the service order first lands in an NBI queue (not shown in FIG. 2), and the service order is received as the result of the NBI 208 polling the NBI's queue.

In general, the service order, when received at the NBI 208, triggers procedure(s) that can make, or lead to, the desired changes happen.

An exemplary service order may include product "fixed GSM," the order "activation," and other data including the client ID, the name or ID of the subscription plan, a SIM (subscriber identity module) card ID, and the MSISDN (i.e., mobile station international subscriber directory number; which is a number that uniquely identifies a subscription in the GSM network). This order may be encoded in a pre-established format (e.g., using the XML language).

The NBI 208 may receive service orders one by one through one interface (e.g., API 210). Additionally, or alternatively, the NBI may have a different API (a bulk/batch interface) that receives service orders in bulk or batches and expects text files that encode many service orders. These alternatives may serve different business cases. For example, adding a broadband-over-LTE service to an existing subscriber might utilize the one single interface (API 210), whereas fulfilling a contract with a medium-sized company, which has requested a "GSM—fixed 100 minutes" subscription plan for all of its 300 employees might utilize a bulk/batch interface at the NBI.

Next, in the illustrated flowchart, the NBI 208 (at 328) validates the service order. In a typical implementation, every service order received at the NBI 208 is validated by using business rules that ensure, for example, that all the required information to execute on the service request is available, correctly formatted, and the subscription details are in order. These business rules are generally encoded a priori into the NBI. As an example, the validation process for a service order to activate a GSM plan may require ensuring that the IMSI/SIM card information has been provided and is correctly formatted. In that case, validation might fail, if, for example, the IMSI identification number provided is missing a digit.

If validation fails, the processing of the service order may cease and the infrastructure may attempt corrective actions (e.g., by notifying the sales representative or someone else at the service provider that the error has occurred and suggest a corrective measure).

If validation succeeds, according to the illustrated flowchart, the NBI 208 (at 330) places the now-validated service order into the service-orders queue (MQ).

The service-orders queue (MQ) (at 332) stores the service order. In some implementations, the service-orders (MQ) is a priority queue and the service orders stored therein are prioritized such that service orders with a higher priority are serviced before lower-priority service orders. See, e.g., Thomas H. Cormen, Charles E. Leiserson, Ronald L. Rivest, and Clifford Stein. Introduction to Algorithms, Second Edition. MIT Press and McGraw-Hill, 2001. ISBN 0-262-03293-7. Section 6.5, which is incorporated by reference herein.

Next, according to the illustrated implementation, the work flow engine (WFE) 214 (at 334) retrieves the service order from the service-orders queue (MQ) 212.

The WFE 214 then (at 366) identifies a workflow that corresponds to the retrieved service order. Each workflow represents steps that need to be performed by one or more components in the service provider's infrastructure 100 for the service order to be satisfied. In a typical implementation, every service order has its own workflow. For example, one workflow corresponds to activating GSM free when the service provider is a CSP; another workflow corresponds to deactivating GSM free when the service provider is a CSP, and so on. In an exemplary implementation, the workflows are generic (i.e., written so as not to be specific to any particular network element manufacturer, model number, protocol, computer language, etc.). Workflows may also be referred to herein as Business Process Management (BPM) workflows. To identify a workflow that corresponds to the service order, the WFE 214 may simply look up the corresponding workflow from a workflow database (not shown in FIG. 2) that matches workflows to service orders. Logic to perform this task may be programmed into the workflow engine 214 during system set up.

Next, according to the illustrated flowchart, the WFE 214 (at 338) performs any preprocessing that may be required to implement the workflow.

Preprocessing in this regard may include, for example, confirming that the network elements 205 required to execute the workflow are active. In this regard, the WFE 214 may interact with one or more databases (e.g., a network elements database) to identify any network element that may be required to participate in executing the workflow. In some implementations, the network elements database may identify, for each network element, the service orders it can implement. In some implementations, the network elements database may include information that indicates, for each one of a variety of different workflows, which of the network elements, or network element types, may be required to participate. In some implementations, the network elements database lists for each network element type, the specific instances of this type of network element and associated information (e.g., vendor, model, IP address, etc.). Typically, the networks elements database, like the service orders database, is populated during system setup.

Preprocessing, in some implementations, may also involve the WFE 214 retrieving from one or more databases and connectors any other information that may be needed to execute the workflow and fulfill the service order. In an exemplary implementation, the WFE 214 accomplishes this by interacting with a subscriptions database (that includes subscription information) and/or other databases to retrieve the information. For example, the WFE 214 might use a SIM card ID to retrieve additional info for the SIM card. Then, the WFE 214 might assemble the workflow names and data as depicted in the next example for calling a workflow in charge of activating a GSM subscription with the input of a SIM card ID and a MSIDSN.

---
GSM add ready to activate service order
---
workflow name: f-activate-gsm100.bpm
parameters:
    SIM: 100123123
    MSISDN: 123123123
---

Once this information is assembled and the required network elements 205 are determined to be available, the workflow engine 214 (at 340) executes according to the workflow involving other system components (at 342), such as the ready-to-activate service orders queue 216, the provisioning engine 218, and/or one or more of the network elements 205, as required. In an exemplary implementation, the workflow execution proceeds from the start node and moves through the workflow's nodes according to the workflow's logic until an end node is reached, with steps being performed by the WFE 214, if possible, and other steps being performed (at 342) by one or more of the network element(s) 205, if needed, for example, utilizing the R2A queue 216 and provisioning engine 218 to support outreach to the one or more network elements 205.

Generally speaking, a BPM workflow or "workflow," is a collection of related, structured activities or tasks or steps that produce a specific service. A BPM workflow can be encoded, for example, using the BPMN (Business Process Model And Notation™ (BPMN™) Version 2.0) business process standard. A workflow generally starts with a start event, which is followed by activities, some of which may be executed sequentially, some of which may be executed in parallel, and may include events that depend on the result of certain activities, and may include forks or merges (e.g., an IF/ELSE condition, activities executed simultaneously).

Figure 4:
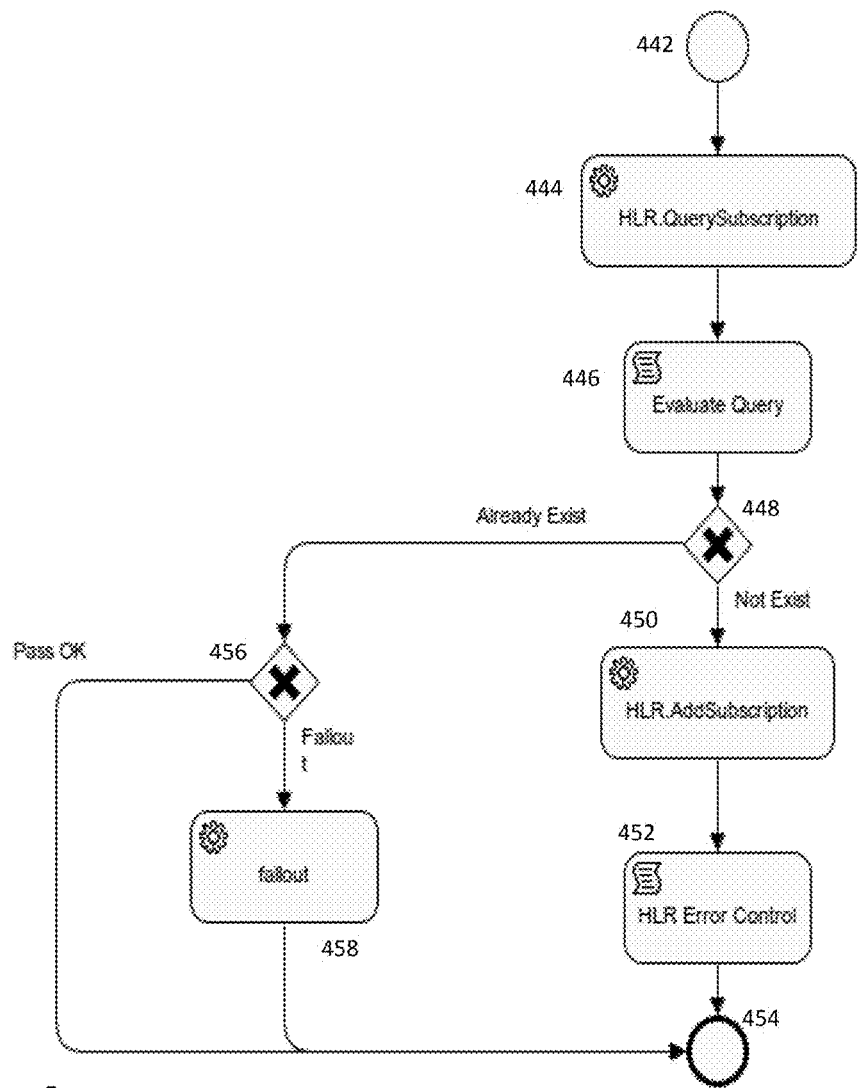
FIG. 4 is a flowchart representing an exemplary workflow for activating a service in the service provider's infrastructure of FIGS. 1 and 2.

FIG. 4 is a flowchart representing an exemplary workflow for activating a service in the service provider's infrastructure of FIGS. 1 and 2. The service to be activated according to the illustrated flowchart is a home location register (HLR), and the workflow essentially adds a subscription for the HLR service.

The illustrated workflow has a start (at 442). Next, the workflow (at 444) includes a query as to whether an HLR subscription already exists. Next, the workflow (at 446) evaluates the result of the query. There is a fork (at 448) in the workflow that can proceed in two possible ways depending on whether the HLR subscription exists already or not. If the HLR subscription does not exist, then the workflow (at 450) calls for adding a new HLR subscription. After the new HLR subscription is added, the workflow (at 452) calls for implementing an error control process. The illustrated workflow then ends (at 454). If the query reveals that an HLR subscription already exists, then the workflow calls for determining (at fork 456), whether the situation is ok, in which case, the process simply ends (at 454), or whether actions should be taken to address the situation, which case, the workflow calls for a fallout procedure (at 458).

Figure 5:
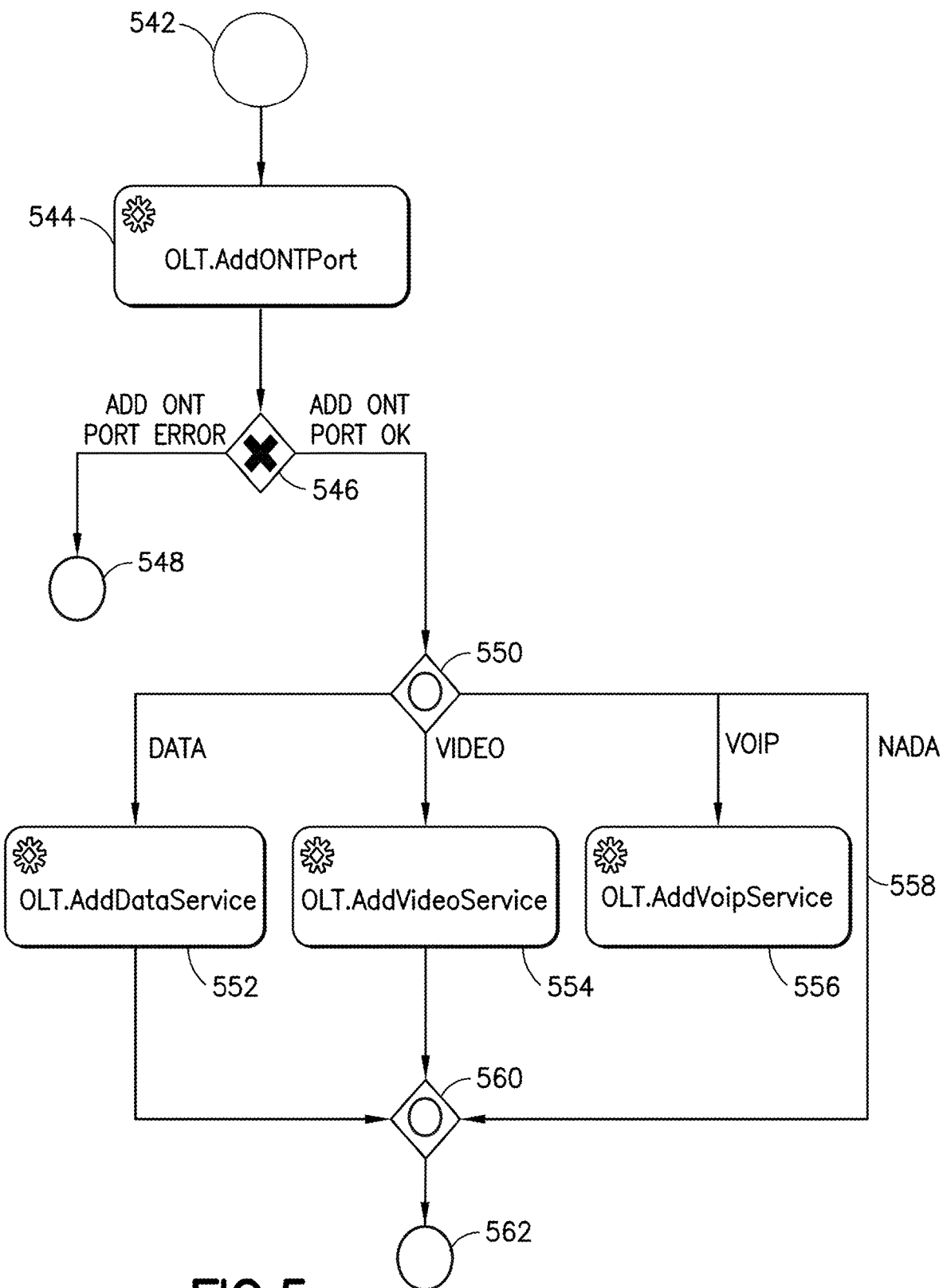
FIG. 5 is a flowchart representing another exemplary workflow.

FIG. 5 is a flowchart representing another exemplary workflow.

The illustrated workflow has a start (at 542). Next, the workflow (at 544) has an OLTAddONPort activity. There is a fork (at 546), from which the workflow that can proceed in two possible directions: an add ont port error direction, which leads to a workflow end point (at 548), and an add ont port ok direction, which leads to a video fork, from which the workflow flows in four (e.g., parallel) directions: one leads to an OLTAddDataService activity (at 552), one leads to an OLTAddVideoService activity (at 554), one leads to an OLTaddVoipService activity (at 556), and one that is labeled nada (at 558). These branches recombine at 560 and the workflow ends at 562.

The workflow in FIG. 5 can be used to discuss the infrastructure (e.g., 100 in FIG. 1) executing a complete fallout. As pointed out above, the illustrated workflow has an OLTAddDataService activity (at 552). If, for example, the OLTAddDataService activity (at 552) fails, then, according to one exemplary implementation, the workflow ends (at 562) and a complete fallout is executed. This (complete fallout) means that the infrastructure executes the reverse of the OLTAddVideoService and OLT.AddVoipService activities e.g. OLTRemoveVideoService and OLTRemoveVoipService), and then executes the reverse of the OLT.AddONTPort activity (e.g., OLT.RemoveONTPort).

Workflows can be designed in any one or more of a variety of possible ways. In some implementations, the workflows are designed using a product-service-resource hierarchy model. In the case of a mobile telecommunications service provider, for example, a product may be one of the subscription plans offered by the service provider, a service can be considered as an abstraction that describes one, of possibly many, functionalities that can be included in the product. For example, a "GSM fixed plan" may include any one or more of 50 MB voicemail functionality, limited SMS, etc. Additionally, a resource may be considered as representing a logical resource needed to implement the service, such as a network element 205.

Individual workflow activities (or steps) may or may not involve the network elements 205. In a typical implementation, for each step in a particular workflow (see 344), the WFE 214 (at 346) considers whether a network element needs to be involved in that step. In an exemplary implementation, an activity involving a network element 205 may be executed through the provisioning engine 218 by instantiating one or more network connectors 220. This can be done, for example, by sending (at 35) a ready-to-activate service order to the provisioning engine (PE) queue (i.e., the R2A services MQ 216). The PE 218 eventually executes the ready-to-activate service order and returns a response to the WFE 214.

In a typical implementation, the workflow engine 214 (at 348) executes the other activities which do not involve (or require involvement of) the network elements 205. In one implementation, these activities (which do not involve network elements 205) may be encoded in code using the JavaScript programming language, and the workflow engine 214 may use a Java server (not shown in FIG. 2) to interpret this code.

An example of an activity that does not involve (or require involvement of) the network elements 205 is that of implementing some validation logic. In an exemplary implementation, in order to validate that the HSS, HLR and MMS services have been added to a subscription, the workflow includes first three independent activities that validate each of the three services individually (each activity returns a TRUE/FALSE clause), and a last activity (which does not involve network elements 205) that answers that the validation is passed if, and only if, the three earlier validations were passed. The workflow engine (WFE) 214 in that situation would receive the three TRUE or FALSE statements and would answer TRUE only if the three statements are TRUE. This last step (the answering of TRUE only if the three statements were true) does not require involvement of the network elements 205 and, therefore, would be performed by the workflow engine 214.

In a typical implementation, workflow forks (e.g., exclusive, event-based or parallel gateways) and merges are handled by the workflow engine 214, without involvement from any of the network elements 205.

In a typical implementation, the workflow engine 214 also manages workflow events and information states.

Some workflows may include support and/or validation sub-workflows. For example, a validation may include, but not be limited to, activities to test service levels and, depending on these service levels, return with success or failure. If the validation results in failure, the workflow engine 214, in some implementations, logs the problem, for example, to the fallout management tool.

In some implementations, the workflow engine 214 may follow an exception path in a first workflow (e.g., at an exclusive gateway) in order to execute a second workflow that is referred to herein as a fallout. Simply put, workflows may include monitoring results against expectations at certain points of its execution (that is to say, it may include tasks that validate if the results are agreeable). Typically, each of these validations is accompanied by a fallout, so that if/when a validation is not passed, the fallout is executed.

Activities executed by network elements (e.g., through the provisioning engine) can be classified as critical or non-critical. This classification may be part of a workflow configuration.

In an exemplary implementation, if a validation is applied for a critical activity and fails, then the workflow engine 214 executes a complete fallout using all the context data (that is, the information state and database information) of the first workflow (see, e.g., FIG. 5). Generally speaking, a complete fallout is used to undo any changes made during the failed execution of the first workflow. In a complete fallout, the inverse of each ready-to-activate service order is executed, and this happens in the inverse order. For example, the inverse of an activation is a deactivation, etc.

Alternatively, in an exemplary implementation, if the validation for a non-critical activity fails, then the WFE 214 may be configured to continue executing the workflow (e.g., through an alternative workflow path (e.g., a second sub-workflow)).

The following example helps illuminate the difference between a critical and non-critical failure, in an exemplary implementation. Assume the workflow engine 214 is executing a workflow to activate a GSM plan which includes 3g and 4g services, plus also add services for voicemail, multimedia messaging and group/shared plans. If the voice and data 3G/LTE services cannot be activated, then this is considered critical (because the other services depend on them) and a complete fallout is executed. On the other hand, if any of the remaining non-critical services cannot be validated, then the system may simply log the problems (without complete fallout) and may execute a partial fallout—but otherwise considers the activation successful.

In order to help ensure efficiency, in a typical implementation, each workflow has a "Service Level Agreement (SLA)". The SLA for a particular workflow may include, for example, a timeout value, and/or an orders per second value. More generally, the SLA can include any condition that can be verified by a computer system. If the WFE 214 is executing a workflow and the timeout is exceeded (or more generally, if the execution does not follow every requirement in the SLA), then, in an exemplary implementation, the WFE 214 rolls back any changes made in attempting to execute the workflow and marks the workflow as failed. Moreover, in a typical implementation, each network element 205 also has an analogous SLA and when the network element timeout is exceeded (or some other network element SLA-imposed restriction is breached), the WFE 214 marks the activity as failed. This failure may cause a complete fallout or a partial one, depending on the criticality of the activity.

In certain implementations, the management applications 222 include a fallout management tool, which collects logs for workflow failures and fallout (complete and/or partial) executions. Logs are essentially data entries in a database and may include, for example, the workflow name, the date and time of the error/exception, the name of the network element 205 that returned the error, the reason for the failure, and any other data returned by the network connector 220. In an exemplary implementation, the collected logs typically include failed validations, and also all the commands sent to the network elements 205, and the answers they provided.

In a typical implementation, the provisioning engine (PE) 218 (at 352) reads ready-to-activate orders from a queue (i.e., the "R2A services MQ" in FIG. 2), transforms them (360, 362) into commands that can be executed by the specific target network element 205, places them into a queue for the network element(s) 205, parses the results (at 368) returned by the network element(s) 205 (at 366), and computes the configured output parameters (also at 368), and returns it to the workflow engine 214 (at 370).

Typically, network elements 205 get "registered" during set up by a user acting on behalf of the service provider. At that time, a registered connector/network element becomes part of the network elements database. The system, at this time, registers generic commands that are available for this network element type, and also registers how these generic commands are (or can be) translated into a syntax that is understood by the specific network element. All this is part of the setup which gets encoded into the network connector for this network element, and it is described in a section below.

Below is an example of a ready-to-activate service order for adding a subscriber to a DSLAM (Digital Subscriber Line Access Multiplexer) service, which is a critical service for a DSL fixed-data subscriber. Note that it includes the name of the device (DSLAM01) and the required data, herein in an XML format.

| dslam add ready to activate service order |
| --- |
| Ready-to-activate service order<br>Order type: DSLAM-ADD<br>Target: DSLAM01<br>Data: <xml><profile>Internet100</profile>...</xml> |

In an exemplary implementation, the provisioning engine (PE) 218 works as follows. Periodically, the PE 218 polls the ready-to-activate service orders queue 216. After reading a ready-to-activate service order (at 352), the PE 218 validates (at 354) that the target network element 205 (for that order) is in the network elements database (not shown in FIG. 2), and assigns the order to a queue that is specific to this network element 205. In a typical implementation, if there is no network element (354) with the "target" name in the network elements database, the PE 218 (at 356) answers with an error (358).

The PE 218 typically maintains one or more connections at any given time with the network element(s) 205 as defined in the network connector(s) 220 configuration. For example, the PE 218 may maintain a pool of five (5) connections with a network element. The PE 218 also typically maintains a table (e.g., in a database) with the state of each of these connections (e.g. which may be BUSY or AVAILABLE).

In an exemplary implementation, if one new ready-to-activate service order is inserted by the PE 218 into the queue for a particular network element 205, the PE 218 next polls the network connectors 220 for this network element 205. If all the network connections for this network element 205 are BUSY, then the PE 218 will wait and periodically re-ask until one of the network connections becomes available. If, at some point, the PE 218 determines that one of the network connections is AVAILABLE in the connections pool for this network element 205, the PE 218 marks that connection as busy.

Next, according to this exemplary implementation, the PE 218 verifies that the connection is alive. This can be done, for example, through a specific connection-validation probe that the PE 218 issues. If the connection has been lost, then the PE 218 can implement a connection handshake. If the connection is alive and has not been lost, the PE 218 may read the ready-to-activate service order or orders.

In a typical implementation, a ready-to-activate service order (a connection validation probe, connection handshake and others) is a generic method available for this network element type.

In order to execute a ready-to-activate service order, the PE 218, in an exemplary implementation, constructs specific, non-generic, commands for the network element 205 that translate the ready-to-activate service order. To do this, the PE 218 can retrieve (at 360) the specific method syntax by querying a methods database (not shown in FIG. 2), which can be within the network connector 220. The PE 218 assembles (at 362) the specific, non-generic command with the specific parameters and sends this through the open network connection.

The target network element 205 receives the command and (at 364) performs whatever activity may be indicated by the command. The target network element 205 (at 366) returns an answer to the PE 218 after the activity is performed by the target network element 205. The PE 218, in turn, uses an output-parsing specification to parse (at 368) the answer and, thereby, retrieve output parameters. In a typical implementation, the output parameters are returned to the WFE 214. (See Setup section for more details.)

As a specific example, in an exemplary implementation, the ready-to-activate service order to add a ready-to-activate DSLAM user (shown in the dslam add ready to activate service order entry above) may be translated to a telnet session with the following commands:

| dslam add ready to activate service order |
|---|
| > connect 10.20.0.50 |
| > execute add internet100 |
| > execute commit |
| > exit |

In an exemplary implementation, the PE 218 parses the output returned by the network element 205 (according to the underlying network connector) to obtain the output parameters (if any) which have been configured for the generic methods of this network element type. In the above example, the output returned by the network element 205 may be the word "Done", and the output returned to the WFE 214 may be the output parameter named SUCCESS with the value TRUE.

When the PE 218 is finished executing the ready-to-activate service order(s), it marks the network connection as AVAILABLE in the connection database.

In a typical implementation, the network elements (of all types) utilize a generic keep alive method that prevents the link between the PE 218 and the network element 205 from breaking. As an example, when the connector runs a command against a network element 205, it resets to zero a time counter that is assigned to this network element 205. If the time counter associated with a particular network element exceeds a keepAlive threshold, then the connector uses the keep-alive method (see the "Setup" section for more details). The counter is reset if the keep-alive method is successful, or the connection is initiated again if the keep-alive method is not successful.

Typically, the keep-alive method for a particular network element 205 is defined during setup and involves a small message requiring minimal bandwidth. Keeping connections "alive" generally saves time, since most protocol implementations require using more time-consuming commands to initiate or wake up a connection which has been broken.

System Setup

In a typical implementation, an operator working for the service provider sets up the system/infrastructure in advance of the infrastructure performing the functionalities disclosed above. During setup this operator interacts with several of the components described herein. For example, the operator may go over or perform one or more of the steps set forth here.

Service Order Management Configuration

In a typical implementation, the operator defines the business rules at the northbound interface 208, that is, develop a script with a set of rules for each service order posted by the CRM 102. These orders are then part of the service orders database.

Generally speaking, a business rule explains how to receive a service order from the CRM 102, and decompose this into lower-level service orders and orchestrate these into an array of workflows. Examples of CRM orders include but are not limited to create/change/delete equipment, create/change/delete subscriptions, execute support operations, etc.

Workflow Configuration

In a typical implementation, the operator develops the BPM workflows and then assigns a workflow to each lower-level service order from the previous step. These workflows can be implemented according to the BPMN standard. Implementing the workflows generally includes, but is not limited to, defining the resource orders (ready-to-activate-orders) execution sequences, defining fallout rules, and defining logs.

Network Connectors Configuration

In an exemplary implementation, in order to complete network element 205 configuration, the operator can follow three steps:

1. establish the network element types,
 2. define the generic methods underlying each network element type, and
 3. specify which are the specific network element types in the network and what are their locations and connection details.

A connector design framework may be used to design, develop, test and deploy interfaces with network elements. In an exemplary implementation, the process proceeds in the following steps:

1. Add new "network type":
   a. A network type is named. Examples include but are not limited to Remote Authentication Dial-In User Services (RADIUS), routers, Home Location Registers (HLR), Digital Subscriber Line Access Multiplexer (DSLAM), web servers, cable modems (DOCSIS), E-MTAs (PacketCable), set-top boxes, ONTs (GPON), OLTs (optical line terminal), modems xDSL, set-top boxes.
   b. Define its generic parameters, for example, network interface address, username and password, port, et cetera.
   c. All its methods are defined, including the name of each method, its input parameters and its output parameters. For example, in the case of the network element type GPON (or Gigabit-capable Passive Optical Network) the generic methods may include, but be not limited to, UNMS.AddONTPort, UNMS.AddDataService, UNMS.AddVideoService, UNMS.AddVoipService, UNMS.DeleteDataService, UNMS.DeleteVideoService, UNMS.DeleteVoipService, UNMS.DeleteONTPort, UNMS.ModifyONTPort, UNMS.ResetONTPort, UNMS.ModifyDataServiceProfile, UNMS.SuspendDataService, UNMS.ResumeDataService, UNMS.SuspendVideoService, UNMS.ResumeVideoService. In turns, each of these generic commands, take as input certain (generic) parameters and return generic responses. For example, in the case of UNMS.ResumeVideoService the generic parameters may be defined as device, shelf, slot, port, ontid, vlanid, gemportid, uservlan.
2. Implement a network type:
   a. Select network element type.
   b. Enter vendor, model and version for this network element type.
   c. Enumerate the parameters that define the network interface. For example, a list of these parameters could be: "IP address, port, keepAlive, username and password".
   d. For each generic method defined in the previous step, provide an implementation of this method and how to parse the output parameters from the network element's output. For example, the UNMS.ResumeVideoService implementation in a Huawei-TL1 GPON is done according to the following syntax:

```
// Unblock the IPTV port
ACT-SERVICEPORT::DEV=device,
       FN=shelf,
         SN=slot,
            PN=port:100::VLANID=vlanid,
            ONTID=ontid,
            GEMPORTID=gemportid,
            UV=uservlan;
//Example
ACT-SERVICEPORT::DEV=MA5600T_LABORATORIO_CLAROPR,
       FN=0,
         SN=1,
            PN=0:100::VLANID=35,
            ONTID=6,
            GEMPORTID=1,
            UV=300;
```

3. Instantiate a network connector
   a. Select network type. (This is similar to 2a. In the first case the person is defining a "generic" network connector. There may be many network connector instances with the same network type. These are defined in step 3. For example, first define a generic router, and then define the Linksys instance and the Netgear instance.)
   b. Select vendor, model and version for this.
   c. Specify the network interface parameters, e.g., a valid IP address where the NE is located, the port it uses, a keepAlive value which stands for the number of seconds that the system waits (if the NE is inactive) before sending a probe to the NE, an integer acting as the pool size.
   d. Additional information, such as a secondary network element that can be used if the primary fails, et cetera.

When a network connector is instantiated, the connector design framework may first check if the database holds the implementation of the generic methods for the specific vendor-model-version selected for this network connector. If the translation is unavailable it checks if it can find method specifications for a network element with the same vendor and model, but the biggest of the available versions which are smaller than the one selected. Alternatively, it will relax the model and version specifications, but look for method specifications from the same vendor. Finally, if these are not available, it looks for specifications from any vendor.

Fallout/Failure Management

In an exemplary implementation, a support employee for the service provider may be in charge of reviewing the failures logged into the fallout management tool. When the support employee checks the fallout management tool, the tool, in a particular implementation, offers any one or more of these options (this information can generally be accessed by the support employee at a computer-based user interface device coupled to the fallout management tool):

The tool list all the aborted workflows. Therefore, the support employee can check how many times the execution of each of the workflows failed.

The support employee can also access statistics for the error type in each case (e.g., what is the validation that failed).

The support employee can also ask the tool to run or rerun workflows and sub-workflows. (The use case for this being that the support employee will analyze aborted workflows, fix whatever is broken, and rerun any workflows that were aborted due to this problem.)

Optionally, workflows may be configured to run with certain variations when they are run for a second time. Generally speaking, they can be configured to force some commands which were executed more cautiously in the first workflow execution. Say, for example, that a workflow (A) attempts to add a user to the user database, but fails and the database returns with an error. Assume that this is a critical operation and thus the workflow fails, and aborts immediately without executing other activities. Assume that the failure happened because the user had already been added to the database. When the workflow is rerun, the WFE 214 first deletes the user and cascading information—thus making sure that the addition does not fail—and then adds the user according to the parameters defined in the workflow. To do this, the second workflow (B) which forces the database operation is added to the workflow database and the fallout management tool is configured so that when rerunning workflow (A) it actually runs workflow (B).

Additionally, in some implementations, the support employee can generate reports to identify recurring problems.

A number of embodiments of the invention have been described. Nevertheless, it will be understood that various modifications may be made without departing from the spirit and scope of the invention.

For example, in various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. For example, many databases are described—these can be implemented as one single database (or collection of information, or many. As used herein, database can mean one or more databases.

Similarly, while operations are disclosed herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product(s) accessible from a computer-usable or may be incorporated into a computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The user-functionalities associated with the system disclosed herein can be accessed from virtually any kind of electronic computer device, including, for example, cell phones and tablet.

Other implementations are within the scope of the claims.

What is claimed is:

1. A computer-based method for managing services provided by a service provider, the computer-based method comprising:
    receiving a service order at a workflow engine;
    sending a ready-to-activate service order and data to a provisioning engine;
    assembling a command at the provisioning engine, in a format that is specific to a network element, to perform the ready-to-activate service order;
    sending the network element-specific command from the provisioning engine to the network element; and
    learning at the workflow engine, that a critical condition has not been met and, in response, executing a fallout workflow,
    wherein executing the fallout workflow comprises:
        executing opposite actions of the workflow in a reverse order.

2. The computer-based method of claim 1, wherein sending the ready-to-activate service order and data to the provisioning engine occurs in response to a determination that network element involvement is needed to perform a step involved in satisfying the service order.

3. The method of claim 1, further comprising:
    periodically sending a probe from the provisioning engine to the network element to validate that a connection between provisioning engine and the network element remains alive.

4. The method of claim 3, further comprising:
retrieving login credentials and signing in the network element.

5. The method of claim 1 further comprising:
receiving a response to the network element-specific command from the network element at the provisioning engine; and
parsing the response at the provisioning engine.

6. The method of claim 5, further comprising returning the parsed response to the workflow engine.

7. The method of claim 1 further comprising:
executing a fallout workflow at the provisioning engine in response to the workflow engine learning that the ready-to-activate service order failed.

8. The method of claim 1 further comprising:
retrieving data from a database and computing the ready-to-activate service order in response to receiving the service-related request.

9. The method of claim 1, further comprising:
performing any step involved in satisfying the service order that does not require involvement of a network element at the workflow engine.

10. The method of claim 1, further comprising:
the service-provider's system receiving one description for one network element type; and
the service-provider's system receiving syntax for a ready-to-activate service order related to the one network element type.

11. A method for managing client services and infrastructure of a service provider, wherein the infrastructure comprises a northbound interface (NBI), a workflow engine, a provisioning engine and network connectors, the method comprising:
retrieving, at the NBI, a service order from a queue, validating that the NBI can fulfill the service order and retrieving information from a database,
sending the service order from the NBI to the workflow engine,
retrieving, at the workflow engine, a workflow associated with the service order from the database;
executing the workflow with the workflow engine; and
learning, at the workflow engine, that a critic a condition has not been met; and, in response, executing a fallout workflow,
wherein executing the fallout workflow comprises:
executing op site actions of the workflow in a reverse order.

12. The method of claim 11 further comprising:
following a logic in the workflow at the workflow engine; and
sending a ready-to-activate service order from the workflow engine to the provisioning engine.

13. The method of claim 11 further comprising recording actions taken and result in a log.

14. A computer-based system for managing client services and infrastructure of a service provider, the system comprising:
a northbound interface;
a service orders queue;
a workflow engine;
a ready-to-activate service orders queue;
a provisioning engine; and
a plurality of network connectors,
wherein the northbound interface receives a service order, validates the service order, and places the service order in the service orders queue for the workflow engine to process,
wherein the workflow engine retrieves the service orders from the service orders queue, identifies a workflow that corresponds to the service order, and executes according to steps in the workflow, and
wherein the workflow engine is configured such that, upon learning that a critical condition has not been met, the workflow engine executes a fallout workflow, whereby actions that are opposite those indicated in the workflow are performed in a reverse order.

15. The computer system of claim 14, wherein executing according to the steps in the workflow comprises:
for any steps that do not require action from a network element that is coupled to one of the network connectors, performing the step at the workflow engine.

16. The computer system of claim 15, wherein executing according to the steps in the workflow further comprises:
for any steps that do require action from a network element that is coupled to one of the network connectors:
placing a ready-to-activate service order in the ready-to-activate service orders queue.

17. The computer system of claim 16, wherein the provisioning engine:
reads the ready-to-activate service order from the ready-to-activate service orders queue;
assembles a command for the network element, from which action is required, in a format that is specific to that network element; and
sends the command to that network element.

18. The computer system of claim 17, wherein the provisioning engine:
receives a response to the command from the network element; and
parses the response to identify one or more parameters associated with the response.

* * * * *